United States Patent [19]
Pirotta et al.

[11] Patent Number: 6,132,132
[45] Date of Patent: Oct. 17, 2000

[54] WATER-BASED ROAD MARKING PAINT

[75] Inventors: Marico Giuseppe Pirotta, Antibes-Juan les Pins; Angelo Sanfilippo; Andrew Paul Trapani, both of Valbonne, all of France

[73] Assignee: Rohm and Haas Company, Philadelphia, Pa.

[21] Appl. No.: 09/267,328

[22] Filed: Mar. 12, 1999

Related U.S. Application Data

[62] Division of application No. 08/807,858, Feb. 26, 1997, Pat. No. 5,947,632.

[51] Int. Cl.$^7$ .............................. B05D 3/02; C08J 5/20; F21V 7/22; E01C 3/06; C09D 1/00
[52] U.S. Cl. ............................. 404/9; 427/372.2; 521/28; 523/172; 106/31.05
[58] Field of Search ....................... 404/9, 12; 106/31.01, 106/31.05; 523/172; 521/25, 28; 427/372.2, 385.5, 393.6

[56] References Cited

U.S. PATENT DOCUMENTS

| Re. 28,531 | 8/1975 | De Vries | 260/22 CB |
|---|---|---|---|
| 3,356,624 | 12/1967 | Neal et al. | 260/18 |
| 3,494,878 | 2/1970 | Harren et al. | 260/2.2 |
| 4,203,878 | 5/1980 | Bauer | 260/18 EP |
| 4,389,328 | 6/1983 | Bellettiere et al. | 252/194 |
| 4,436,845 | 3/1984 | Kitano | 523/172 |
| 5,112,391 | 5/1992 | Owen et al. | 75/772 |
| 5,169,262 | 12/1992 | Wilson et al. | 404/84.05 |
| 5,340,870 | 8/1994 | Clinnin et al. | 524/522 |

FOREIGN PATENT DOCUMENTS

| 0 200 249 A1 | 12/1986 | European Pat. Off. . |
|---|---|---|
| 0 322 188 B1 | 6/1989 | European Pat. Off. . |
| 0 409 459 A2 | 1/1991 | European Pat. Off. . |
| 64-40577 | 2/1989 | Japan . |
| WO 94/29391 | 12/1994 | WIPO . |

OTHER PUBLICATIONS

Abstract—"Fluorescent marking composition for snow-covered road—containing fluorescent dye, water–absorptive resin and water" & JP 01 040 577 A (Nippon Oils & Fats KK) Feb. 10, 1989; Chemical Patents Index, Documentation Abstracts Journal Week 8912 May 17, 1989; Derwent Publications Ltd., London, GB; AN 89–089987; XP002054567.
European Search Report—Application No. EP 97 30 1031.

*Primary Examiner*—Eileen D. Lillis
*Assistant Examiner*—Gary S. Hartmann

[57] ABSTRACT

A water-borne road marking paint is disclosed characterised in that incorporated within the paint are particles of a solid polymer or inorganic compound, which are capable of absorbing water. Preferred particles are ion exchange resin beads. Incorporation of such particles either during or immediately after application of the paint results in a substantial improvement in the speed of drying of the paint on the road.

8 Claims, No Drawings

WATER-BASED ROAD MARKING PAINT

This is a divisional application of U.S. Ser. No. 08/807,858 filed Feb. 26, 1997. now U.S. Pat. No. 5,947,632.

The present invention relates to water-based road-marking paints, and more particularly to such paints which have a rapid drying time.

One of the important features of road marking paints is the speed at which they dry after application, since this dictates the level of disruption required to road traffic in order to be able to apply them. Such paints have traditionally been based on resins dissolved in organic solvents. Besides being potentially polluting to the environment, such solvents evaporate rapidly after application of the paint on the road (necessary for the fast drying of the freshly applied marking) and thus expose the people working with them to potential health hazards. Because of this, the development of more environmentally friendly road-markings is desired.

One type of more environmentally friendly road-marking paint is provided by using water-borne rather than solvent-borne polymer dispersions. Unfortunately however, it is well-known in the art that the drying time of water-borne paints is strongly dependent on the relative humidity of the atmosphere in which they are applied. On a humid day, a water-borne paint may take several hours or more to dry, and this prolonged drying time limits severely the practical utilization of water-borne road-marking paints.

Several researchers have attempted to overcome this problem. For example, post-application of salt-solution is described in EP-A-0-200-249 (Akzo). This method can be effective but has some important drawbacks. The paint to be applied must be on the borderline of stability and thus there is always the chance that such a paint will solidify before it is used. Another potential problem is that the film will be dried very quickly on the surface, and this surface skin can impede the further drying of the film. Thus, although the top-most layer will be dry, the bottom-most parts will be still very rich in water, which leads to problems associated with the rain resistance of the freshly-applied road marking. This system, while providing a method for quick-drying water-borne road-marking paints, is rarely seen in commercial operation.

WO 94/29391 (Plastiroute) discloses the use of a water-borne paint based on a special type of aqueous dispersion polymer (the description of which is given in EP-B-0-322-188 and EP-A-409459 (Rohm and Haas)) and a system of post-application of a water-soluble acid to the freshly applied paint. This method obviates the need for having a barely stable paint, but also suffers from the potential drawback that the film will be dried very quickly on the surface, the resultant skin impeding further drying of the film.

These previous attempts to induce a quick-dry in a water-borne road-marking paint teach the use of a water-soluble agent for provoking acceleration of the drying. We have unexpectedly discovered that completely insoluble, dry, solid, extremely hydrophobic, polymer particles brought into contact with a water-borne road marking paint can cause an extremely rapid drying of the freshly applied paint.

Accordingly in a first aspect the present invention provides a water-borne road marking paint characterised in that incorporated within the paint are particles of a solid polymer or inorganic compound, which are capable of absorbing water by coordination.

A further aspect of the invention provides a method of accelerating the drying of a water-borne road marking paint on a surface, comprising applying the paint to the surface and spraying onto the applied paint particles of a solid polymer or inorganic compound, which are capable of absorbing water.

The invention comprises also in a further aspect the use of particles of a solid polymer or inorganic compound, which are capable of absorbing water by coordination, to accelerate the drying of water-borne road marking paints.

Remarkably enough, even though the aforementioned particles are not soluble and contact only the surface of the paint, the drying is not just at the surface. In fact, the drying can occur throughout the depth of the film, as can be demonstrated by testing the water-resistance or rain-resistance of the freshly applied paint.

The present invention is particularly useful for accelerating the drying of new thick film paint formulations, which contain 87–93 wt% total solids in order to enable films of thickness 1 mm and greater, typically from 1 up to 3mm to be painted. Because of their relatively substantial thickness, such films dry fairly slowly despite the use of quick-drying binders such as those disclosed in EP-B-0-322-188 and EP-A-409459 as mentioned above.

One preferred type of particle is any type which absorbs water by coordinating with water molecules. A commercially available example of polymer particles which can absorb water by coordination is the type of product commonly known as ion-exchange resins. We have found that, in general, regardless of the specific chemistry of the ion exchange resin, these particles—which are completely insoluble, dry, solid and extremely hydrophobic—provoke an unexpectedly short and complete drying of the paint film when brought into contact with a freshly-applied water-borne road marking. As explained above, this rapid drying is extremely important in the practice of road-marking and can allow for the rapid and simple application of horizontal road signalization based on water-borne products. In addition, since many researchers have found that water-borne road-markings last longer than their solvent-borne counterparts, this invention which enables the facile and efficacious use of water-borne paints in the field of road-marking can also give rise to important economic advantages due to the extended life of the water-borne markings.

We have found that ion exchange resins do not permanently adhere to the paint surface and thus do not make any undesirable permanent change in the film. In fact, generally the beads have been found to bounce off the surface of the wet paint coating if sprayed onto it, remaining in contact just long enough to absorb water from the paint. This remarkable property is a major advantage of this embodiment of the present invention. The sprayed beads lie loose on or adjacent the applied paint, from where it is envisaged that they could be collected, probably by vacuuming up, and reused. Depending on the amount of water which they have absorbed, the beads would optionally be dried before reuse, although it is possible that this may not be necessary. This would of course be a major cost saving, as well as being environmentally beneficial. A further significant cost saving is made because we have found that used ion exchange resin beads work as well in this application as new beads.

One possible method of application of the beads is to mix them with the glass beads currently post-applied to many road-markings (to give night visibility). Any ion-exchange beads which adhere to the paint like the glass beads would increase the roughness of the film, and this is a highly desirable property because it can increase the skid-resistance of the road marking.

In addition to ion-exchange resin beads, other particles which may be used in the present invention are solid particles which are capable of absorbing water Examples include superabsorbent polymeric gels such as "Sumica gel", dried hollow-sphere polymers such as dried "Ropaque OP-62" and talc.

The normal method of application of the particles to the road marking paint is to spray the paint, followed by any glass beads, and then finally to spray the particles. Alternatively the particles may be applied before or together with the glass beads, or even incorporated into the fan of paint as it is sprayed. In the latter case, the particles are less likely to bounce off the surface of the paint. The rate of application of the particles depends on the rate of drying required. However a density of 30 g particles per $m^2$ of applied paint is normally the maximum needed.

The particles may be applied in conjunction with the acid or salt solution treatments disclosed in WO 94/29391 and EP-A-0-200-249.

Additionally, the particles may be applied as a kind of 'curative' step after the application of the road-marking paint. By "curative-step" is meant that if a road-marking crew has applied by the usual means a water-borne road-marking paint and they find that it is not drying quickly enough, they can initiate a notable acceleration of drying by applying particles in accordance with the invention. The situation can be envisaged in the case of a water-borne road-marking operation which commences under favourable climatic conditions (e.g. 20° C. and 50% relative humidity), but is finished under unfavourable conditions such as 10° C. and 85% relative humidity. In such a case, the more recently applied water-borne road-markings will dry very slowly (if at all) and it will be difficult or impossible to allow the traffic to circulate normally on the newly painted road. In such a case, the road-marking crew can post-treat the more recently applied road-markings with particles according to the invention. This will cause a rapid drying of the water borne road-markings and will allow for the normal circulation of the traffic.

It is further envisioned that the use of the present invention in a curative step could be particularly useful during the application of water-borne road-markings of large surface area such as pedestrian crossing commonly known as "zebra crossings".

A further benefit of the invention relates to the application of glass beads in road-marking paints. Such beads are well known to attract water, which causes the beads to agglomerate together. These agglomerations impede the beads from flowing freely, which can be a significant problem during the utilisation of glass beads for road-marking purposes. If, in accordance with the present invention, the particles of solid polymer or inorganic compound are mixed together with the glass beads during application, the free-flowing characteristics of the glass beads are substantially increased by limiting their tendency to form intractable agglomerates. The benefit of the invention is particularly effective when the particles comprise a dried, fine diameter, hollow-sphere-shaped polymer. Such particles could be obtained by the drying of a water-borne, hollow-sphere opacifying polymer such as Ropaque OP-62 (commercially available from Rohm and Haas Company).

Examples of road marking paints dried by the post-application of ion exchange resin beads are given below.

EXAMPLE 1

With a drawdown blade having a gap of 600 microns, a water-borne road-marking paint described in Table 1 was applied on a thin plastic substrate. This is a paint based on a quick-set binder. The application was repeated. One application was dried without any additions: the other application was treated with a post-spray (29 $g/m^2$) of ion-exchange beads of the type CG-6000 (Na form). The drying conditions were 23° C., 50% relative humidity (RH), low air flow.

After 20 minutes of ambient drying the following observations were made:

Water-borne road-marking paint A, no post treatment: The paint was observed to be rather wet, with a skin present, but the thumb twist dry-through test (as described by ASTM D1640 with the exception that no thumb pressure is used) revealed that underneath the dry skin, the majority of the paint was wet and uncured. The film was soaked in water: it was completely dissolved away after 4 minutes' immersion. The dry-to-no-pick-up time of the film, as measured by ASTM D713, was about 7 minutes.

Water-borne road-marking paint A, treated with a post spray of ion-exchange beads (type CG-6000 (Na form): This film was dry through as tested by a thumb-twist (as described above). Soaking this film in water revealed that it was still intact after 4 minutes of immersion. Even after water immersion the film was very solid and resistant. The dry-to-no-pick-up time of the film, as measured by ASTM D713, was about 3 minutes.

This Example shows that the present invention provides for a significantly shorter dry-to-no-pick-up time and a significantly shorter time for the development of resistance to water immersion. Surprisingly enough, these results are actually better than the quick-set technology described in EP-B-0-322-188 and EP-A-0-409-459 (Rohm and Haas).

EXAMPLE 2

With a drawdown blade having a gap of 600 microns, a water-borne road-marking paint described in Table 1 (a quick-set type paint) was applied on a thin plastic substrate. This application was repeated. One application was dried unaltered. The other application was treated with a post-spray (29 $g/m^2$) of ion-exchange beads of the type CG-6000 (Na form). The drying conditions were 23° C., 95% RH, no air flow.

After 20 minutes of drying under these high humidity, zero air-flow conditions the following observations were made.

Water-borne road-marking paint A, no post treatment: The paint film was observed to be extremely wet. The thumb twist dry-through test (as described above) revealed that the paint was wet and uncured. Upon soaking in water, the film was completely dissolved away after less than 4 minutes of immersion.

Water-borne road-marking paint A (a quick dry type paint), treated with a post spray of ion-exchange beads (type CG-6000 (Na form)): The paint film was dry-through as tested by a thumb-twist (as described above). Soaking this film in water revealed that the film was intact after 4 minutes of immersion. Even after this water immersion the film was very solid and resistant.

Example 2 shows that the present invention provides for a significantly shorter dry-to-no-pick-up time and a significantly shorter time for the development of the resistance to water immersion of a water-borne road-marking even when the freshly-applied road-marking is dried under the extremely unfavourable climatic conditions of 95% RH. Again it is noted that these results improve upon the quick-set technology described in EP-B-0-322-188 and EP-A-0-409-459.

EXAMPLE 3

Paint A was applied on a plastic support with a drawdown blade having a gap of 300 microns. A quantity of ion-exchange beads (Amberjet 1200H (acid form)) was sprinkled (29 g/m²) over half of the drying film. The following observations were made.

Portion with post treatment of ion-exchange beads: after 2 mins drying at 23° C. and 50% RH, this film survived intact a water soak of 4 mins.

Portion without a post-treatment of ion-exchange beads: this portion required 15 minutes of drying at 23° C. and 50% RH before it was able to survive four minutes' immersion in water intact.

Example 3 shows that the chemistry of the ion exchange bead (acid form vs. Na form) is not crucial for obtaining acceleration of drying.

EXAMPLE 4

Paint B described in Table 2 (a conventional, slow drying type paint) was applied on a plastic support with a drawdown blade having a gap of 300 microns. A quantity of ion-exchange beads (Amberjet 1200H, acid form) was sprinkled (29 g/m²) over half of the drying film. The following observations were made.

Portion with post treatment of ion-exchange beads: after 4 mins drying at 23° C. and 50% RH, this film survived intact a water soak of 4 mins.

Portion without a post-treatment of ion-exchange beads: this paint required 45 minutes of drying at 23° C. and 50% RH before it was able to survive a four minute immersion in water intact.

Example 4 shows that the technology works with conventional type paints as well as with quick-set type paints.

EXAMPLE 5

Paint A (a quick-set type paint) was applied on a plastic support with a drawdown blade having a gap of 300 microns. A quantity of ion-exchange beads (CG-6000 Na form) was sprinkled (29 g/m²) over half of the drying film. The following observations were made.

Portion with post treatment of ion-exchange beads: after 5 mins drying at 23° C. and 50% RH, this film survived intact a water soak of 4 mins.

Portion without a post-treatment of ion-exchange beads: this paint required 17 mins. of drying at 23° C. and 50% RH before it was able to survive a four minute immersion in water intact.

TABLE 1 formulation of Paint A, based on a quick-drying-type acrylic emulsion polymer

| INGREDIENTS | K grams | Function |
|---|---|---|
| Add the following under moderate stirring: | | |
| Primal E-2706 (50%) | 495.0 | Quick-set emulsion polymer |
| Orotan 901 (30%) | 8.5 | Pigment dispersant |
| Triton CF-10 | 4.5 | Surfactant |
| Drew TG-4250 | 4.0 | NON-SILICONE defoamer |
| Water | 80.0 | |
| Tioxide TR-92 | 270.0 | Titanium dioxide |
| Durcal 5 | 400.0 | Ca carbonate, 5 microns |
| Durcal 10 | 400.0 | Ca carbonate, 10 microns |
| Mix the above for 20 mins; Do not grind. | | |
| When smooth, add: | | |
| Ethanol------------/ | 23.0 | Freeze-thaw stabilizer |
| Texanol-----------/ | 26.5 | Coalescent |
| Add these 4 as a | | |
| Water---------/premix | 8.0 | |
| Ammonia (25%)--/ | 0.4 | As necessary to keep pH above 9.6, see note above. |
| Drew TG-4250 | 1.6 | NON-SILICONE defoamer |
| Water | 20.0 | Adjust for proper viscosity |
| Mix well | | |
| Silica S21 | 300.0 | Large particle silica |
| Water | 5.9 | Adjust for proper viscosity |
| Drew TG-4250 | 1.0 | NON-SILICONE defoamer |
| Mix well | | |
| Total | 2048.4 Kg | |
| or about 1000 liters | | |

Primal E-2706, Orotan 901 are available from Rohm and Haas Company, Triton CF-10 is available from the Union Carbide Company. Tioxide TR-92 is available from the Tioxide Company. Durcal 5 and 10 are available from the OMYA Company. Drew TG-4250 is available from the Drew Company. Texanol is available from the Eastman Chemical Company. Silica S21 is available from the Company Silice Et Kaolin.

TABLE 2 formulation of Paint B, based on a conventional acrylic emulsion polymer

| INGREDIENTS | K grams | Function |
|---|---|---|
| Add the following under moderate stirring: | | |
| Rhoplex AC-630 (50%) | 495.0 | Conventional emulsion polymer |
| Orotan 901 (30%) | 8.5 | Pigment dispersant |
| Triton CF-10 | 4.5 | Surfactant |
| Drew TG-4250 | 4.0 | NON-SILICONE defoamer |
| Water | 80.0 | |
| Tioxide TR-92 | 270.0 | Titanium dioxide |
| Durcal 5 | 400.0 | Ca carbonate, 5 microns |
| Durcal 10 | 400.0 | Ca carbonate, 10 microns |
| Mix the above for 20 mins; Do not grind. | | |
| When smooth, add: | | |
| Ethanol------------/ | 23.0 | Freeze-thaw stabilizer |
| Texanol-----------/ | 26.5 | Coalescent |
| Add these 4 as a | | |
| Water---------/premix | 8.0 | |
| Ammonia (25%)--/ | 0.4 | As necessary to keep pH above 9.6, see note above. |
| Drew TG-4250 | 1.6 | NON-SILICONE defoamer |
| Water | 20.0 | Adjust for proper viscosity |
| Mix well | | |
| Silica S21 | 300.0 | Large particle silica |
| Water | 5.9 | Adjust for proper viscosity |
| Drew TG-4250 | 1.0 | NON-SILICONE defoamer |
| Mix well | | |
| Total | 2048.4 Kg | |
| or about 1000 l | | |

Rhoplex AC-630 is available from Rohm and Haas Company. Other ingredients are available as noted in Table 1.

What is claimed:

1. A quick-drying waterborne road marking paint comprising a polymer dispersion and particles, wherein said polymer dispersion comprises quick-drying binder;

wherein said particles are capable of absorbing water and are selected from the group consisting of talc, hollow sphere polymer, a solid polymer and an inorganic compound; and wherein said paint is a two-pack system.

2. The paint of claim 1, wherein the solid polymer comprises ion exchange resin beads.

3. The paint of claim 2, wherein the ion exchange resin beads are in acid, sodium, or potassium form.

4. The paint of claim 3, wherein the paint is a thick film paint formulation containing 87–93 wt % total solids and having a thickness of at least 1 mm.

5. The paint of claim 2, wherein the paint is a thick film paint formulation containing 87–93 wt % total solids and having a thickness of at least 1 mm.

6. The paint of claim 1, wherein the inorganic compound comprises superabsorbent gel.

7. The paint of claim 6, wherein the paint is a thick film paint formulation containing 87–93 wt % total solids and having a thickness of at least 1 mm.

8. The paint of claim 1, wherein the paint is a thick film paint formulation containing 87–93 wt % total solids and having a thickness of at least 1 mm.

* * * * *